United States Patent Office 3,050,863
Patented Aug. 28, 1962

3,050,863
METHOD OF DRYING ATTAPULGITE CLAY DISPERSIONS
Aldo P. Allegrini, Westfield, and Tom A. Cecil, Highland Park, N.J., assignors to Minerals & Chemicals Philipp Corporation, a corporation of Maryland
No Drawing. Filed Dec. 9, 1960, Ser. No. 74,752
5 Claims. (Cl. 34—17)

The present invention relates to an improved method for producing low bulk density products from attapulgite clay and especially to a rapid, economical method for the controlled drying of attapulgite clay dispersions to obtain valuable end products therefrom.

It has been recently found that valuable lightweight products containing microscopic, elongated particles may be produced from colloidal attapulgite clay by substantially completely dispersing the clay in water in the presence of a suitable deflocculating agent for the clay, mildly drying the clay dispersion to produce a material of grindable consistency, grinding and classifying the dried product. The resultant product has a tamped bulk density of the order of 6 to 10 lbs./cu. ft., as compared with a bulk density of about 30 lbs./cu. ft. for the starting clay. The lightweight product obtained by this process is useful as an adsorbent. The oil adsorption of this material, as determined by the well-known Gardner Coleman method, is about 187 g./100 g. linseed oil, as compared with values of 134 and 139, respectively, for the naturally occurring clay and thermally activated naturally occurring clay. When the adsorbent product produced in the manner described above is calcined at elevated temperature of the order of 1650° F. to 1800° F. and the resultant agglomerates broken up, there is obtained an excellent filter aid product, especially useful in the clarification of sugar solutions. The fiberlike form of the adsorbent product obtained by controlled drying of the dispersed clay slip is retained throughout the calcination. The deagglomerated calcined product has a tamped bulk density of the order of 14 to 20 lbs./cu. ft., as compared with values of about 30 lbs./cu. ft. for commercial thermally activated attapulgite clay. The filter aid product obtained in this manner has been found to have filtration properties remarkably superior to that of the naturally occurring attapulgite clay or calcined raw attapulgite clay which has not been previously colloidally dispersed in the manner briefly described.

In producing these new and valuable lightweight products from attapulgite clay, it has been found that in order to obtain adsorbent or filter aid products of optimum quality it is essential to control the steps in the process to obtain final products in which a predominating amount of the particles are fiberlike, typically particles about 2 to 5 microns wide and 10 to 50 microns long. Such fiberlike particles are not to be confused with the ultimate colloidally dimensioned acicular particles composing the aggregates of naturally occurring attapulgite clay in that the latter particles are submicroscopic and can be discerned only with the aid of an electron microscope. Undoubtedly, the novel fiberlike particles consist of a plurality of the ultimate atapulgite particles in a uniquely oriented alignment. More particularly, it has been found that the dispersion step must be carried out in a manner such as to assure the substantially complete dispersion of the aggregates of the starting clay into the ultimate colloidally dimensioned needles composing the aggregate. Extensive experimentation has also shown that during drying the dispersion must be maintained relatively quiescent, and flocculation which would occur, for example, by acidification of the dispersion or by excessive boiling of the dispersion, must be avoided.

These requirements impose certain obstacles in the way of providing an economical process. Turning first to a consideration of the dispersion step, colloidal aqueous dispersions of attapulgite, even dispersions containing highly efficient deflocculating agents such as tetrasodium pyrophosphate (TSPP), are inherently very low in clay solids. When the clay solids exceeds a certain maximum, the excessive clay will not disperse into its ultimate colloidally dimensioned particles. The end products produced using clay in excess of that which is colloidally dispersed during its formulation possess properties approaching those of the naturally occurring clay, depending on the quantity of clay which has not been colloidally dispersed during the processing.

To handle the large quantity of water inherently present in aqueous attapulgite clay dispersions, dryers of large capacity must be available and the fuel expenditure is large. Superimposed on this difficulty in the process as heretofore practiced, is the adverse economics of drying the dilute slips at the very low drying rates dictated by the temperature-sensitive nature of the chemically defluocculated attapulgite clay slip. If the dispersion is subjected to excessive boiling during drying, flocculation occurs and the end products have a high bulk density and do not differ appreciably from the unprocessed clay; in the case of filter aid products, the bulk density of products obtained with too high temperature in the drying step will be in excess of 20 lbs./cu. ft., frequently 30 lbs./cu. ft. or more. The drying has been successfully carried out in the past with ovens, tray dryers and tunnel dryers provided the temperature of the dispersion was kept below about 220° F. and the chamber temperatures below 600° F. Steam heated drum dryers have also been found to be satisfactory provided the steam temperature was kept below about 240° F. However, the drying rates obtainable with these drying methods are very low and such techniques are therefore too expensive from the standpoint of capital investment and operating costs.

A principal object of this invention is the provision of a method for avoiding the above-mentioned difficulties and disadvantages.

A more specific object of this invention is the provision of a method for improving the drying rates of deflocculated colloidal attapulgite clay dispersions in the production of lightweight products from attapulgite clay.

A more specific object is the provision of an improved method for the drum drying of deflocculated aqueous attapulgite clay dispersion, which method is uniquely suited for the drying of this specific type of clay system in a very rapid, uniform manner but without undesirable ebullience of the dispersion when water is evaporated therefrom.

Further objects and advantages will be readily apparent from the description of our invention which follows.

Briefly stated, in accordance with the present invention, a deflocculated aqueous dispersion of colloidal attapulgite clay is formed. The deflocculated dispersion, which is a thin fluid mass, is cast in the form of a thin film onto the outer periphery of an internally heated rotating drum dryer in which hot air is uniformly injected over the drum surface. The steam temperature and air temperature are controlled so as to prevent the clay film from effervescing on the drum surface during the drying and the dried clay film is removed from the drum by a doctor blade or the like.

The subsequent processing will depend on the intended end use of the attapulgite product. In producing adsorbents, the drum dried product may be used without further processing, although usually it will be ground and classified to the desired particle size. For some adsorbent uses it may be desirable to activate the dried material by calcining it to a V.M. of about 2 percent to 6 percent at a temperature of about 600° F. to about 1000° F. In the production of filter aid products, the ground, drum dried product is calcined at about 1650° F. to 1800° F. to a V.M. of about zero. (The term "V.M." is defined hereafter.)

Employing the drying method outlined above, we have been able to increase the dryer production rate of these various low bulk density attapulgite clay products at least two-fold over rates obtained with the conventional internally heated drum dryers. In fact, we have been able to employ drying rates which are considerably higher than would be expected from the additive results of the highest satisfactory drying rates using hot air jets alone and using an internally heated drum alone.

Another important advantage that is realized by drying the clay dispersion in the manner outlined above is that we are able to obtain very uniform drying of the clay film with the drum dryer. It is known that, in general, the temperature and heat transfer coefficient about the circumference of the usual drum dryers is not uniform and therefore that the temperatures of the film and drying surface varies around the circumference of the drum, reaching a minimum near the knives that remove the film. Inasmuch as a purpose of the controlled drying step of our process is to put the dispersion into a solid form which, when ground, will provide uniformly sized lightweight particles, it is highly desirable to maintain the V.M. of the dried product substantially uniform throughout all portions thereof. Any wet spots on the dried film having a V.M., for example, in excess of about 30 percent, will densify during grinding and thereby impair the quality of the finished product. In accordance with our novel drying technique, the heat transferred to the film by the metal drum wall from the condensing steam within the drum is supplemented with heat directly applied to the film by uniformly spaced hot jets of air. In this way, the possibility of local wet spots on the dried film is reduced substantially or is obviated.

More specifically, the starting clay that is employed in carrying out this invention is clay consisting chiefly of the clay mineral attapulgite and which has never been dried to a V.M. less than about 18 percent. The raw clay as mined (which has a V.M. of about 48 percent to 50 percent and a F.M. of about 38 percent) may be used although clay which has been dried somewhat, as to a V.M. of about 20 percent to 25 percent, may be used if desired. The term "V.M." as used herein refers to volatile matter which is the weight percentage of a material which is eliminated when the material is heated substantially to constant weight at 1800° F. The term "F.M." refers to free moisture which is the weight percentage of a material which is eliminated when the material is heated substantially to constant weight at 250° F. In the case of pure clay, V.M. and F.M. are chiefly water. When attapulgite clay is dried to a V.M. less than about 18 percent, it undergoes irreversible impairment or loss of its native colloidal properties and is not useful in the practice of this invention. If desired, the clay may be degritted, as by wet screening, to remove grit and coarse agglomerates. The clay should be in the form of small pieces, ½ inch or somewhat smaller. A typical analysis of attapulgite clay, volatile free (V.F.) clay basis, is as follows:

| | Weight Percent |
|---|---|
| $SiO_2$ | 67.0 |
| $Al_2O_3$ | 12.5 |
| MgO | 11.0 |
| CaO | 2.5 |
| $Fe_2O_3$ | 4.0 |
| Others | 3.0 |

The micalike clays, such as kaolin clay and bentonite clay, are not useful in the practice of this invention.

As mentioned, a deflocculating agent such as, for example, sodium silicate or tetrasodium pyrophosphate, is employed to defloculate the colloidal attapulgite particles which possess interparticle attraction in the absence of the deflocculating agent. The deflocculating agent neutralizes or eliminates the interparticle attraction with a degree of efficiency which depends on the concentration and chemical nature of the deflocculating agent. The action of the deflocculating agent on the clay-water slip is manifest by a marked thinning of the slip when the deflocculating agent is incorporated therein. The deflocculating agent is used in amount typically within the range of about 1.0 percent to about 5.0 percent, based on volatile free weight of the clay. Particularly good results have been obtained using tetrasodium pyrophosphate in amounts of 2.4 percent, based on the volatile free weight of the clay. In general, it may be said that the optimum quantity of deflocculating agent is that which results in an aqueous slip of minimum viscosity. The clay content of the slip will also influence the optimum quantity of deflocculating agent, and clays of different origin will differ in their response to a given amount of deflocculating agent. Other materials used by the clay industry as deflocculating agents may also be used in case simple experimentation indicates that sufficiently fluid slips of the desired solids level can be produced with these deflocculating agents. As examples of such deflocculating agents may be cited disodium dihydrogen pyrophosphate, sodium tripolyphosphate, sodium lignosulfonate, sodium salts of condensed naphthalene sulfonic acids and corresponding potassium and lithium compounds when they are sufficiently soluble. Preferably, we employ as the deflocculating agent tetrasodium pyrophosphate which is an exceptional effective material for the purpose, together with NaOH sufficient to raise the pH of the clay dispersion to 10 to 12 (about 0.25 to 1.00 percent of the V.F. clay weight). Using this particular dispersing agent together with the added NaOH we are able to employ somewhat higher drying temperatures than when tetrasodium pyrophosphate is used without the added alkali. Furthermore, when the clay is dispersed in dilute aqueous solutions of tetrasodium pyrophosphate and NaOH which is hot, but below the boiling point, considerably more concentrated fluid clay dispersions may be formulated than are otherwise obtainable. This reduces the load on the dryers and is conducive to improving the overall economics of the process. The use of these reagents in the production of lightweight adsorbent products from attapulgite clay is claimed in a copending U.S. patent application, Serial No. 38,236, filed March 29, 1960.

Although various materials, e.g., water-soluble surfactants which may improve the dispersion of the clay or other special purpose additives may be added to the dispersion in order to impart special properties to the end product, it is essential to the satisfactory operation of our process to avoid the presence in the clay dispersion of material which will coagulate or flocculate the dispersion which is fed to the drum drying unit. Thus, for example, cations such as $Al^{+3}$, or other ions which will flocculate clay dispersions, should not be present in the dispersion in amount such as to negate the action of the deflocculating agent. Also, for this reason, the pH of the dispersion should be at least about 8, preferably 10 to 12, and should never be reduced to the point at which gelation of the dispersion will occur.

The drum drying unit we employ is obtained by modifying a commercial internally heated rotary drum drying unit with a plurality of jets for passing hot air uniformly over the external drying surfaces of the drum. Preferably, the drum is enclosed in a chamber in which the air jets are mounted. The drum surface adjacent the doctor blade and the feed trough (or other feed applicator means) may be open to the atmosphere, if desired. The jets are arranged in the chamber in a manner such that they can inject hot air onto the drum dryer surface in a uniform manner so that the V.M. of the dried dispersion will be uniform throughout. The feed slurry can be applied to the drum surface by an applicator roll or other means, such as for example, by splash feed or dip feed. If two drying drums are used, the feed can be introduced into the nip of the two drums.

The drum may be any smooth surfaced metal having good heat transfer properties, as exemplified by a chromium plate steel drum or a cast iron drum.

The thickness of the dispersion applied to the drum surface will depend on factors such as the method of feed application and drum speed, and is typically about 1/64 to 1/4 inch. The air temperature and steam temperature are regulated to assure rapid drying of the dispersion while preventing substantial boiling, namely boiling to the extent that the film of dispersion on the drum is ebullient.

Experience has shown that the material is preferably dried to a V.M. not less than 5 percent, and usually to a V.M. within the range of 10 percent and 30 percent. Material dried to a V.M. less than about 5 percent produces excessive undesirable fines (e.g., particles finer than about 2 microns) during the subsequent milling step, whereas material having a V.M. considerably greater than 30 percent may be difficult to grind to the desired degree of fineness.

The dried material, after removal from the drum surface by the doctor blade or the like, is in the form of ribbons or fragments of thin sheets, depending on the method of removing the material from the drum. For some applications, the ribbons or fragments may be used as such although for many of its principal applications the dried product will be subjected to further processing such as grinding, calcination, etc., as mentioned above.

This example illustrates the outstanding improvement in the drying rate of an attapulgite clay dispersion that is realized in accordance with the drum drying process of the present invention, as compared with rates obtainable with conventional drum drying.

The starting clay was crushed raw attapulgite clay from a deposit near Attapulgus, Georgia. The V.M. of the clay was 48 percent and the F.M. about 13 percent. A 24 percent clay solids (V.F. clay basis) dispersion of the clay having about the same consistency as water was prepared as follows. Tetrasodium pyrophosphate and NaOH were dissolved in water in the respective amounts of 2 percent and 0.5 percent (based on the V.F. weight of the clay used). The solution was heated to about 200° F., placed in a Waring Blendor, and raw clay added while operating the mixer at low speed. Portions of the dispersion, after cooling to an ambient temperature of about 70° F., were then subjected to various drum drying tests described hereafter. Drying tests were conducted with external hot air alone, with internal steam and with combinations thereof at various temperatures. In each test, the dispersion was dried to a V.M. of 15 percent to 18 percent.

Inasmuch as the criteria of satisfactory drying include not only drying rate but also product quality, the bulk density of the dried products in each run was measured after each of the dried dispersions was pulverized in a roller mill, ground in a Mikropulverizer (closed circuit) using a .025-inch screen opening, the ground material calcined at 1750° F. for 30 minutes and the calcined product pulverized by screening through a 200-mesh screen. The bulk density of the clay products was determined by the settling method described in U.S. Patent No. 2,480,753 to William S. W. McCarter.

The basic drum dryer used in the tests was a hollow 6 x 8-inch cast iron drum of conventional design and equipped for internal heating with saturated steam and a doctor blade for product removal. The drum drying area was 1 square foot. Three air jets, each connected to a source of hot compressed air, were uniformly mounted about the drum periphery and spaced about 1/2 to 2 inches away from the drum surface. The jets were adapted to deliver hot air at various temperatures under a pressure of 50 p.s.i.g. (as measured in the compressed air line before the jets).

The results of the drying tests which are summarized in the accompanying table show that an excellent low bulk density end product was obtained (run F) at an exceptionally high drying rate of 6.5 lbs./hr./sq. ft. when the hot air jets supplemented the drying action of the steam within the drum. This drying rate was more than three times the rate obtained using internal steam alone (run E) or external hot air alone (run B) at temperatures satisfactory for the production of low bulk density products. Also shown by the data is that in Run C an excellent product was obtained at a drying rate of 2.7 lbs./hr./sq. ft. with the combination of internal steam and external hot air; this value represents an improvement of almost 100 percent over the drying rate of steam or air alone (runs B and E). The data show also that the product of run C, obtained at a drying rate of 2.7 lbs./hr./sq. ft., using internal steam and external air had a bulk density which was only about half that of the product obtained at a similar drying rate of 3.1 lbs./hr./sq. ft. using steam alone (run A).

Obviously, the upper limit to the steam temperature will depend on the particular drum drying unit employed, especially the thickness of the drum and its resultant heat transfer coefficient. Thus, a larger drum with thick walls will require a higher internal temperature to produce the same surface temperature as the small drum described above.

It will be understood that the foregoing detailed example of the practice of our invention is illustrative only, for variations and changes may be made in the conditions of the process without departing from the substance of the invention as herein disclosed and defined in the appended claims.

TABLE

*The Effect on Drum Drying Fluid Attapulgite Clay Dispersions With External Heated Air On the Drying Rate and the Bulk Density of the Ultimate Product*

| Run | Steam, Temp., °F. | Air, Temp., °F. | Drying Rate, Lbs./Hr./ Sq. Ft. | Product Bulk Density, Lbs./ Cu. Ft. |
|---|---|---|---|---|
| A | 245 | None | 3.1 | 30.2 |
| B | None | 630 | 1.5 | 21.1 |
| C | 215 | 220 | 2.7 | 16.4 |
| D | 225 | 570 | 5.4 | 23.4 |
| E | 224 | None | 1.9 | 16.0 |
| F | 235 | 300 | 6.5 | 16.9 |

Runs A–D made using splash feed applicator.
Runs E–F made with trough applicator.

We claim:

1. A method for drying attapulgite clay dispersions so as to produce a low bulk density product therefrom which comprises forming a fluid dispersion of attapulgite clay in water containing a deflocculating agent, while maintaining said dispersion in deflocculated condition applying a thin film of said dispersion to the outer surface of a rotating drum, heating the inner periphery of said rotating drum with steam while simultaneously directly contacting said film with hot dry air which is at a temperature below that which will cause said dispersion to boil, and removing the dried product from the drum surface.

2. A method for producing a low bulk density attapulgite clay product which comprises forming a fluid dispersion of colloidal attapulgite clay in water containing a deflocculating agent for said clay, while maintaining said dispersion in deflocculated condition applying said dispersion as a thin film to the outer surface of a hollow rotating drum, heating the inner periphery of said rotating drum with steam while simultaneously contacting said applied dispersion at the outer periphery of said drum uniformly with hot air which is at a temperature below that which will cause said dispersion to boil and removing the dried product from the drum surface.

3. A method for producing a low bulk density attapulgite clay product which comprises forming a fluid dispersion of colloidal attapulgite clay in water containing a deflocculating agent for said clay, while maintaining said dispersion in deflocculated condition applying said dispersion as a thin film to the outer periphery of a smooth surfaced hollow rotating drum, directing a plurality of jets of hot air uniformly over said film on said drum during its rotation, the temperature of said air being in the range of about 220° F. to about 300° F., while simultaneously heating the inner periphery of said drum with hot steam until the V.M. of said dispersion is within the range of about 10 percent to about 30 percent whereby water evaporates rapidly and uniformly from said dispersion without causing appreciable boiling of said dispersion, and removing the dried product from the drum surface.

4. The method of claim 1 in which said deflocculating agent is tetrasodium pyrophosphate.

5. The method of claim 4 wherein the pH of said dispersion is adjusted to an amount within the range of 10 to 12 by addition thereto of sodium hydroxide.

References Cited in the file of this patent

UNITED STATES PATENTS

| | | |
|---|---|---|
| 1,530,439 | Testrup et al. | Mar. 17, 1925 |
| 1,756,906 | Miketta | Apr. 29, 1930 |

OTHER REFERENCES

McCarter et al.: "Ind. and Eng. Chem.," 42, 529–533 (March 1950).

UNITED STATES PATENT OFFICE
CERTIFICATE OF CORRECTION

Patent No. 3,050,863

August 28, 1962

Aldo P. Allegrini et al.

It is hereby certified that error appears in the above numbered patent requiring correction and that the said Letters Patent should read as corrected below.

Column 4, line 45, for "Serial No. 38,236" read -- Serial No. 18,236 --.

Signed and sealed this 20th day of April 1965.

(SEAL)
Attest:

ERNEST W. SWIDER
Attesting Officer

EDWARD J. BRENNER
Commissioner of Patents